United States Patent [19]

Peters et al.

[11] 3,807,845

[45] Apr. 30, 1974

[54] MICROFICHE READER

[75] Inventors: Arnis E. Peters, La Crosse; Lyle G. Miles, West Salem, both of Wis.

[73] Assignee: The National Cash Register Company, Dayton, Ohio

[22] Filed: Sept. 23, 1971

[21] Appl. No.: 183,272

Related U.S. Application Data

[62] Division of Ser. No. 851,858, Aug. 21, 1969, Pat. No. 3,634,005.

[52] U.S. Cl. .................................. 353/24, 353/101

[51] Int. Cl. ........................ G03b 1/48, G03b 21/11

[58] Field of Search ................................ 353/22–24, 353/27

[56] References Cited

UNITED STATES PATENTS 3,424,524 1/1969 Akiyama .............................. 353/27

*Primary Examiner*—Louis R. Prince
*Assistant Examiner*—A. Jason Mirabito
*Attorney, Agent, or Firm*—George J. Muckenthaler; Wilbert Hawk, Jr.; J. T. Cavender

[57] ABSTRACT

Apparatus for holding a projection lens assembly of a reader in precise position relative to a transparency, the transparency being a plate-like film containing a plurality of reduced images thereon. The lens assembly includes a condenser-type lens for magnifying and for projecting the image in an enlargement thereof onto a screen for viewing the enlarged image, the lens assembly being maintained against the surface of a predetermined image plane by reason of a lens-containing tracking sleeve being spring-urged into contact with the image plane. The lens assembly is spaced from a supporting member by ring means surrounding the tracking sleeve, which permits pivotal action at the nodal point of the lens, to maintain the axis of the lens assembly perpendicular to the image plane for all image-projecting positions of the transparency.

1 Claim, 6 Drawing Figures

MICROFICHE READER

This is a division, of application, Ser. No. 851,858, filed Aug. 21, 1969, now U.S. Pat. No. 3,634,005.

BACKGROUND OF THE INVENTION

In the art of microform systems, the microfilm process probably stands out as being the oldest and most widely known by virtue of its use in the correspondence and communication fields for the purpose of reducing weight during travel of the correspondence. Later, the use of the aperture card combined the microfilm with business machine cards, so that the information on the film could be handled by high-speed electronic equipment. Of course, it may have been considered that the microfilm roll, in an easy-to-handle, compact cartridge, would be the ultimate solution in the storage and retrieval operations because of the ease of handling the cartridge. More recently, however, the microfiche process has evolved, wherein the desired information, in the form of a plurality of pages or documents, is reduced to and recorded on a single card or sheet of transparent film. The microfilm cards, or microfiche (a term now common in the industry), may be standard 3 inch × 5 inch, 4 inch × 6 inch, or 5 inch × 8 inch cards containing the information from the plurality of pages in the form of reduced images, the cards being adaptable for insertion into a reader or viewer which includes a light source, along with a projection lens and a system of mirrors for magnifying the images and for projecting them onto a screen. Lens systems are available which have magnification ratios in the order of 18, 24, 38, or the like, the lens normally being positioned at a specified distance from the microfiche transparency to obtain a pre-focused condition, although there is also available on the reader a focusing device to refocus the lens if this becomes necessary. The transparency holder is moved about, with the light source and the lens assembly remaining in position, to select the page or document desired to be read or viewed.

Representative of such a reader or viewer, as mentioned above, is the micro-image display apparatus shown and described in U.S. Pat. No. 3,424,524, which issued Jan. 28, 1969, on the application of Hideo Akiyama and David G. Stockwell, and is assigned to the same assignee as the application of the present invention. That patent teaches the use of resilient means for accurately maintaining the required working distance between the projection lens and the transparency, the resilient means including a coil spring urging the lens assembly downwardly against a reference surface for all image display positons of the transparency. The coil spring allows the lens assembly to move in a limited vertically slidable direction to maintain the lens in focus, and, in addition, a manually controlled focus-adjusting member is provided to change or vary the working distance between the lens and the transparency. Although that structure accomplishes the intended purpose, it is desirable to provide a simple and low-cost means for maintaining the axis of the lens assembly in constant perpendicular relationship with the transparency to insure proper focus for all of the plurality of the reduced images on the card, regardless of the position of the image on the card or regardless of the condition and attitude of the card.

SUMMARY OF THE INVENTION

The present invention relates to micro-image readers of the microfiche transparency type and more particularly to an image tracking system including a projection lens assembly mounting wherein the assembly is spring-supported and is permitted to pivot about a projection lens plane to maintain the axis of the lens perpendicular to the image plane. The spring support or spring loading of the lens assembly is used in conjunction with a multi-sleeve arrangement for the purpose of keeping one of the sleeves (called a tracking sleeve) in contact with a reference surface, generally a flat transparent member performing as the film image plane, for holding the lens in constant vertical position during the travel of the transparency under the lens and for preventing any buckling of the transparency under the film image plane. It has been found that a few pounds of pressure exerted on the transparency by way of the spring loading of the lens assembly onto the flat transparent member or image plane generally sustains the transparency in a straight or even plane in the area surrounding the place of contact.

With the spring loading feature providing pressure on the lens assembly, the assembly is free to move in a vertical, or up-and-down, direction only, with the requirement that the image plane itself must always be perpendicular to the axis of the lens to prevent an out-of focus condition. Since the transparent cards or microfiche are subject to variances in construction, and since they may also change in evenness or flatness during use by reason of temperature and humidity conditions, it has become more difficult to maintain the perpendicular relationship between the lens axis and the image plane by providing only the spring loading feature.

With this in mind, the present invention incorporates, in addition to the spring loading, the use of pivot means for the lens assembly in the form of an O-ring surrounding the image tracking sleeve and cooperating with the spring loading feature to slidably reference the assembly in the vertical direction and also to maintain the axis of the lens perpendicular to the image plane. The O-ring allows the image tracking sleeve and the balance of the lens assembly to pivot slightly in response to variations in the image plane during travel of the transparency under the lens in the selection of the desired image to be viewed, thus allowing for these variations or minor discrepancies in the flatness of the transparency, but at the same time maintaining the perpendicularity required for proper focus of the lens. It is easily understood, of course, that any condition at the light source and lens assembly end of the optic system which may be or cause an out-of-focus relationship will be greatly exaggerated when magnified onto the screen. This, it is clear, makes it extremely important that the lens pick up the image of a page or document in its entirety and within focus to present a clear and sharp projection of the image onto the screen for viewing by the operator.

In line with the above discussion, the principal object of the present invention is to provide an improved tracking arrangement for a microfiche reader.

Another object of the present invention is to provide means for maintaining the lens system in focus as the transparency is moved about under the tracking member.

A further object of the present invention is to provide a spring-urged tracking member adaptable for pivoting about an axis to maintain the tracking member perpendicular to the transparency.

An additional object of the present invention is to provide ring means separating the lens assembly and its support, so that the lens assembly is pivotable about a lens plane to maintain its axis normal to the transparency.

Still a further object of the present invention is to provide improved focus adjustment means independent of the spring-urged tracking member for changing the working distance of the lens system due to minor variations in the transparency.

Additional advantages and features of the present invention will become readily apparent and fully understood from a reading of the following description taken together with the annexed drawings, in which:

FIG. 1, on the sheet with FIG. 3, is a front perspective view of a microfiche reader incorporating the present invention;

FIG. 2 is a front elevational view of the reader, absent the image screen for showing the upper and rear mirror arrangement and showing the position of the projection lens assembly in relation to the transparency carrier;

FIG. 3, on the sheet with FIG. 1, is a side elevational view, in partial section, of the transparency carrier and the associated spring-loaded projection lens assembly;

Figure 1:
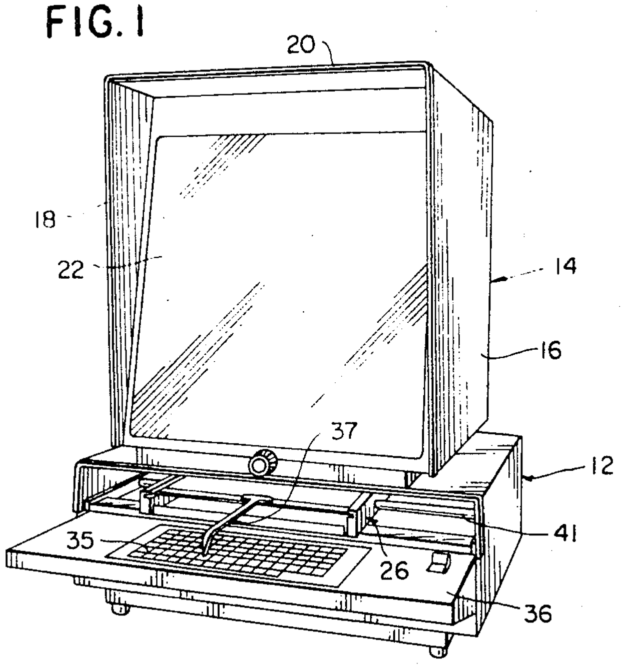
Figure 2:
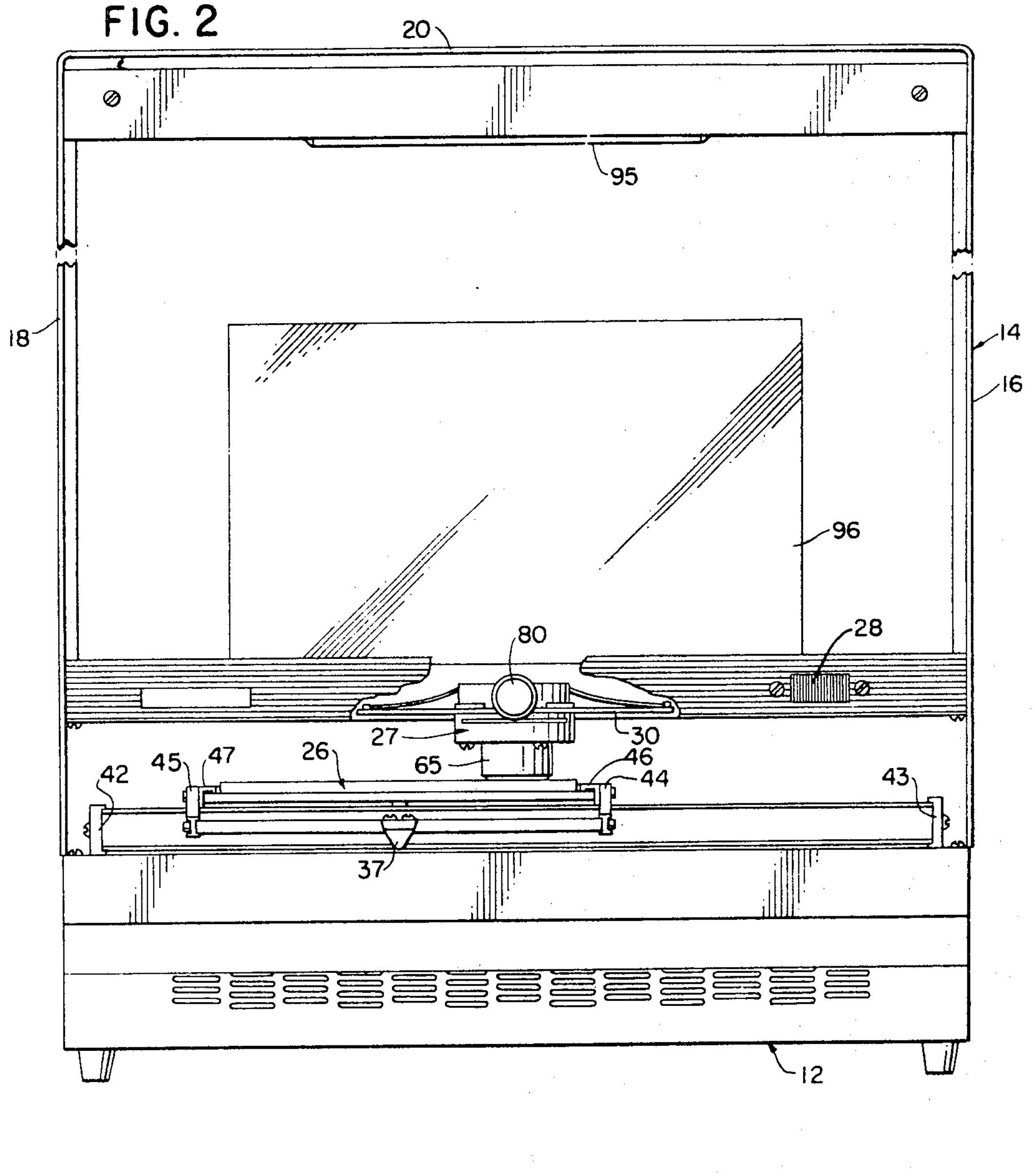

Referring to the drawings, a reader of the type embodying the structure of the instant invention is shown in FIGS. 1 and 2 and includes a base, generally designated as 12, and an upper, formed enclosure 14 having side plates 16 and 18 and a top portion 20. Toward the front of the enclosure is supported a viewing screen 22 placed at an angle wherein the upper part of the screen is recessed into the enclosure to provide a suitable viewing or reading surface for the operator. The base 12 is constructed in a manner suitable for containing a light source 25 (FIG. 5), a film holder or transparency carrier assembly 26, and a projection lens assembly 27, shown in FIGS. 2, 3, and 4. The light source 25 is fed from a suitable circuit (not shown) and is controlled by a switch 28 (FIG. 2).

The projection lens assembly 27 includes a lens assembly panel 30 (FIGS. 2, 3, and 4) supported from the base 12 in fixed relationship thereto and to the upper enclosure 14, so that, with the light source 25 being held in position in the base structure, the light therefrom is transmitted up through the lens in a steady beam when the switch 28 is actuated to the "on" position. The transparency carrier assembly 26, on the other hand, is capable of movement in the lateral, or side-to-side, direction and also in the fore-and-aft direction in relation to the fixed lens assembly 27. The transparency carrier assembly 26 moves along tracks, rails, or shafts in a manner to be described.

Figure 3:
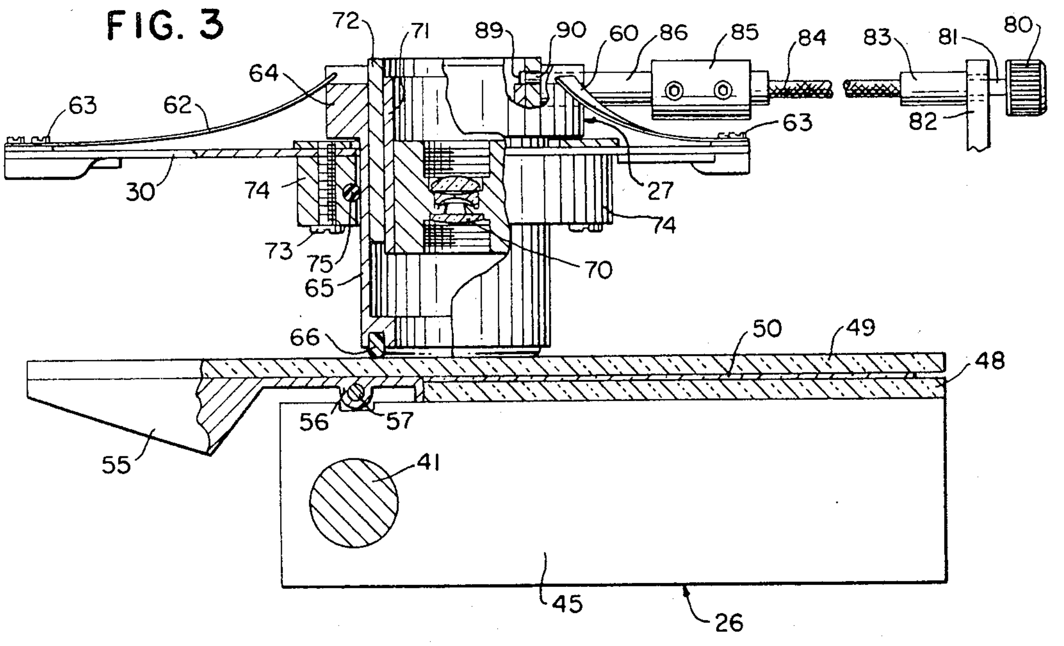
Figure 4:
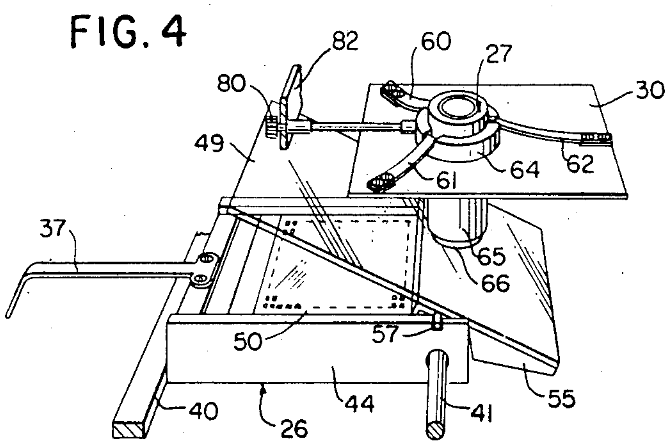
FIG. 4 is a perspective view of the transparency carrier in the transparency loading position.
Figure 6:
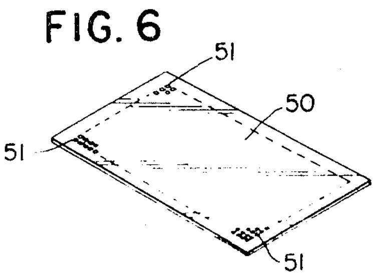
FIG. 6 is a view of a transparency containing a plurality of micro-images thereon.

Referring back to FIG. 1, the transparency carrier assembly 26 is shown in position for reading a transparency or microfilm having thereon images which are presented in a pattern across the film generally corresponding to an index plate or grid 35 carried on a projecting member 36 of the base. A pointer 37 is fixed to a frame member associated with the transparency carrier for the purpose of selecting and matching the pointed index with the desired image to be read from the transparency It is understood, however, that the transparency contains images thereon which are many times reduced in size from the original documents, so that, with a low magnification ratio, it is possible that two or three pages will appear on the screen 22 when the pointer 37 is moved to a particular index grid. On the other hand, with a high magnification ratio, it is possible that perhaps the screen will display only half a page of the document when the pointer is located on a particular grid. Of course, the area surrounding the carrier assembly, when in its mid-position, is void of any obstruction, so that the carrier can be freely moved about in selecting the desired image. As best seen in FIG. 4, the carrier assembly 26 is movable in the side-to-side direction along a rail or track 40 at the front of the reader and along a rod or shaft 41 rearward of the track, the extent of side movement being controlled by the upstanding rails 42 and 43 (FIG. 2). Fore-and-aft movement of the carrier assembly 26 is accomplished by manually pulling and pushing the pointer 37 or its associated structure, the track 40 and the shaft 41 being carried in this movement by means of end connections on suitable rods (not shown). The carrier assembly 26 has right and left side plates 44 and 45 including rails 46 and 47 for carrying a pair of transparency plates 48 and 49 (FIG. 3), the plates being juxtaposedly supported for containing a transparency in sandwich fashion therebetween. With reference to FIG. 6, the transparency shows and is a thin flexible transparent film 50 having recorded thereon a large number of micro-images 51, normally one of which is selected at any one time to be projected upon the screen 22. In this respect, the magnification ratio of the lens usually matches the image size on the transparency to be compatible therewith.

The transparency plates 48 and 49 or, as commonly referred to, glass flats contain the film therebetween in an even or level condition to permit the lens assembly to see the selected image and to pick up the image in a level plane, so as to present a clear projection of the image on the screen 22. The lower flat 48 is maintained in a fixed position in relation to the carrier assembly, so as to afford a flat receiving surface for the film 50 as it is inserted into the carrier and between the glass flats. The upper flat 49 extends rearwardly of the flat 48 (to the left as seen in FIG.3) and includes an enlarged lower portion 55 fixed to the rear part thereof and extending forwardly to form a hub 56 for pivoting on a pin 57. The enlarged lower portion 55 serves as a counterweight in aiding the raising of the forward part of the glass flat 49 when the flats are moved to the forward position for either insertion or removal of a film. As seen in FIG. 4, when the transparency carrier assembly 26 is pulled forward to a position wherein the pin 57 is ahead or in front of the centerline of the lens assembly 27, the counterweight 55 comes into play and automatically opens the upper flat for removal thereof to expose the film. Since the lens assembly generally rides on the upper surface of the glass flat 49 (FIG. 3), the counterweight tips said flat open as the carrier is pulled to the front position (to the left in FIG. 4).

The projection lens assembly 27 is carried on the lens assembly panel 30 and is substantially supported therefrom by means of leaf springs 60, 61, and 62 (FIG. 4) equally spaced and each fixed to the panel 30 by a pair of screws 63, so as to maintain the lens assembly in position and to prevent rotation of the lens. The other end of each spring is seated in a matching recess in a collar portion 64 (FIG. 3) of a tracking sleeve 65, which sleeve extends downwardly through an opening in the panel 30 and which contains the lens assembly. Secured to the tracking sleeve 65, at its lower periphery, is a lens tracking ring 66, which is maintained in contact with and which glides over the top surface of the glass flat 49 as the film holder or transparency carrier assembly 26 is moved about during the selection of an image to be viewed. A projection lens 70 is enclosed and contained within an inner sleeve 71 carried in a lens sleeve 72 slidable up and down in the tracking sleeve 65. Secured to the under side of the lens panel 30 by means of screws 73, and surrounding the tracking sleeve 65 and spaced therefrom, is a lens guide 74, which guide has a recess or notch formed around its interior diameter for reception of a resilient ring 75. As seen in the sectional portion of FIG. 3, the ring 75 separates the screw-retained lens guide 74 from the spring-held tracking sleeve 65 by a predetermined amount, so that some relative movement is possible between the guide and the sleeve. While the leaf springs 60, 61, and 62 urge the collar portion 64 downwardly to maintain the tracking sleeve ring 66 in full contact with the upper glass flat 49, the O-ring 75 allows the tracking sleeve 65 and the parts contained therein to pivot slightly, so that the sleeve will be maintained perpendicular to the upper glass 49.

The structure thus far described provides for maintaining an even pressure on the glass flat 49 through the tracking sleeve ring 66 by reason of the leaf springs 60, 61, and 62 urging the tracking sleeve and lens assembly downwardly. The lens assembly is also maintained perpendicular to the glass flat 49 by reason of the slight pivotal permitting action through the O-ring feature, so that any uneven surface across the glass flat will be compensated by the pivoting of the lens assembly. As seen in FIG.3, the O-ring 75 is placed at the nodal point of the lens, so that any pivoting of the lens assembly will not affect the degree of focus once it has been established. In other words, the focus is maintained as the transparency carrier assembly is moved about in relation to the lens assembly during the selection of an image to be viewed.

Provision is also made to manually change the lens focal length if a film of different thickness is inserted between the glass flats 48 and 49. A manually controlled focus knob 80 (FIG. 3) is supported by means of its shaft 81 from a reader frame portion 82, the shaft

81 being journaled thereat in a suitable bushing 83. A flexible shaft 84 extends from the bushing 83 to a coupling 85, which, in turn, is secured to a focus shaft head 86. The lens sleeve 72 has a saw cut or kerf 89 in one side thereof for reception of a focus shaft head pin 90, which pin is offset from the axial center of the shaft head 86. The pin 90 extends within the kerf 89, so that, when the knob 80 is turned in one or the other direction, the eccentric action therebetween raises or lowers the lens sleeve 72 and the lens 70 within the tracking sleeve 65 to re-focus the image. This re-focus feature has no effect upon the downward urging of the lens assembly by the leaf springs or upon the permitted pivotal action of the tracking sleeve by reason of the O-ring, because the knob 80, though supported by the machine frame portion 82, operates through the flexible shaft 84, to maintain independence in movement of the lens assembly from the focus control.

Figure 5:
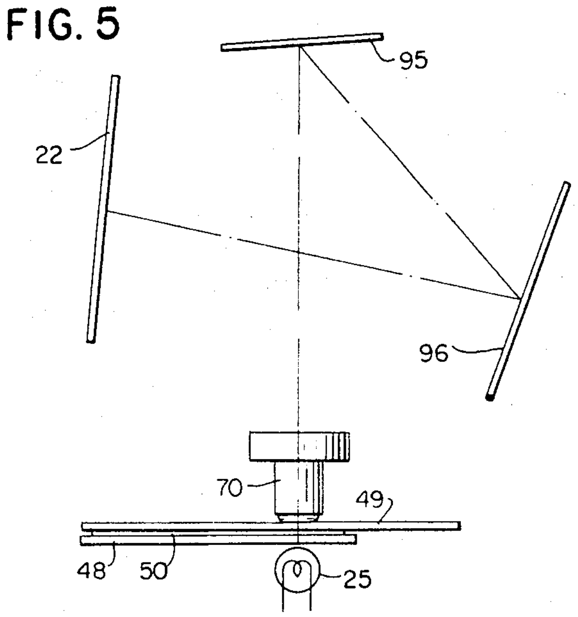
FIG. 5 is a diagrammatic view showing the principal parts of the optic system employed in the reader.

FIG. 5 shows the path of the projected image from the transparency 50 through the lens 70 upward to a mirror 95, rearward and downward to a mirror 96, and forward onto the screen 22.

It is thus seen that herein shown and described is a microfiche reader which includes features for maintaining a focused condition during selection of any image on the film by reason of the urging of the leaf springs and the pivotal action imposed on the lens assembly. While the invention has been shown and described in one embodiment, certain variations may occur to those skilled in the art, so it is contemplated that all such variations having these features are within the scope of the invention.

What is claimed is:

1. In a microfiche reader having a screen, a projection lens assembly, and a film holder adaptable for movement in a direction for readily accepting the film or for removal thereof, said film holder including a lower transparent member for carrying the film, an upper transparent member for providing pressure to maintain the film in a straight condition, the upper member being pivotable about an axis positioned rearwardly of said lower member, and extended means comprising a counterweight securely connected to the upper member and having a hub which pivotally connects said upper member and said counterweight for movement as a unit about said axis, the center of gravity of said counterweight (more) being offset from said axis for causing pivoting of the upper member when the film holder is moved in said direction.

* * * * *